W. J. WHITE & W. F. NEAL.
AIR COMPRESSING PUMP.
APPLICATION FILED MAY 1, 1915.
1,208,426.
Patented Dec. 12, 1916.
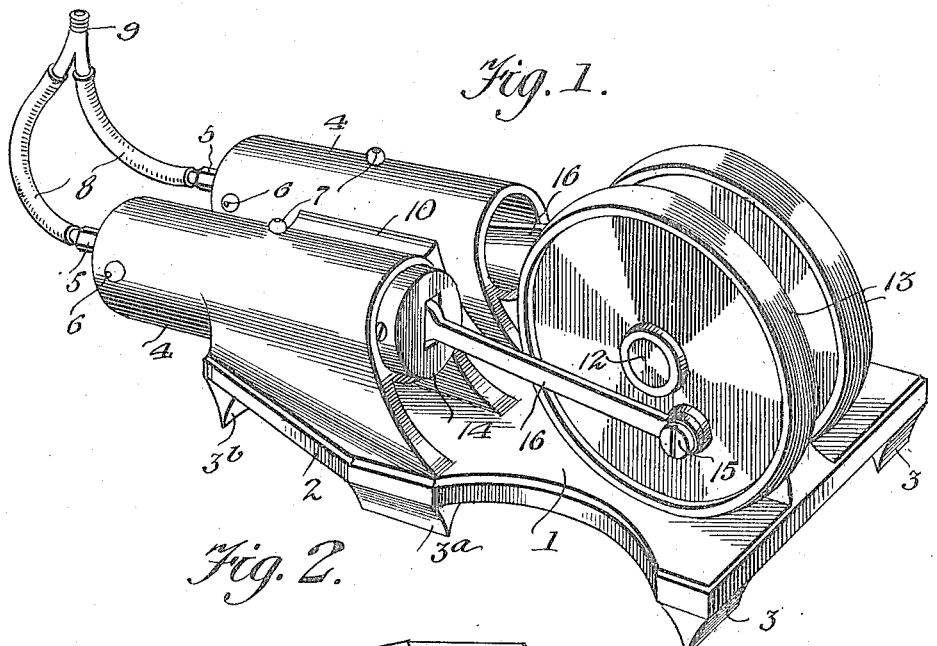
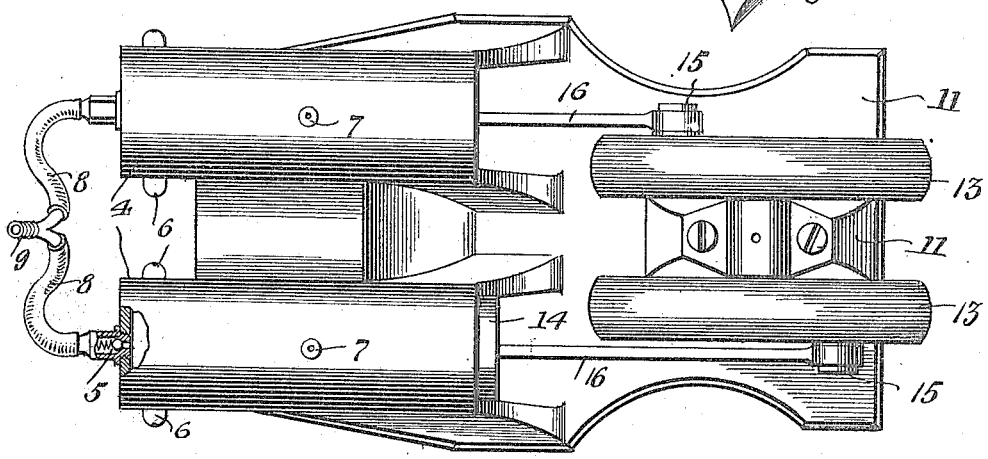
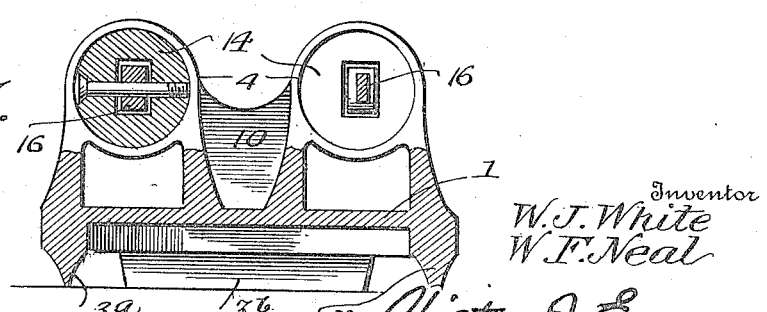
Inventor
W. J. White
W. F. Neal
Witnesses
By Victor J. Evans
Attorney

UNITED STATES PATENT OFFICE.

WILLIAM JOSEPH WHITE AND WILLIAM FRANK NEAL, OF BIRMINGHAM, ALABAMA.

AIR-COMPRESSING PUMP.

1,208,426.  Specification of Letters Patent.  Patented Dec. 12, 1916.

Application filed May 1, 1915. Serial No. 25,223.

*To all whom it may concern:*

Be it known that we, WILLIAM JOSEPH WHITE and WILLIAM FRANK NEAL, citizens of the United States, residing at Birmingham, in the county of Jefferson and State of Alabama, have invented new and useful Improvements in Air - Compressing Pumps, of which the following is a specification.

This invention is an improved air compressing pump especially adapted for use in inflating automobile tires, and adapted to be driven by frictional contact with one of the rear wheels of an automobile, the object of our invention being to provide an improved pump of this character which is cheap and simple, is strong and durable, which may be readily arranged for operation, and is not likely to get out of order.

The invention consists in the construction, combination and arragement of devices hereinafter described and claimed.

In the accompanying drawings, Figure 1 is a perspective view of an air compressing pump constructed in accordance with our invention. Fig. 2 is a plan of the same. Fig. 3 is a detail sectional view of the same.

In accordance with our invention we provide a base 1, which is preferably a casting and is provided with a depending flange 2 extending around its edges, the said flange being provided at points under the front corners of the base, with a longitudinally extending toe, the opposite ends of which being provided with downturned spurs 3 which are adapted to be forced down into the ground in order to firmly hold the pump in place and arrange it for operation by an automobile wheel. The base is also provided with side toes 3ª, adapted to be driven down into the ground, and also has a back toe 3ᵇ.

On one end of the base are a pair of cylinders 4 each of which has a ball check valve 5 at its outer end and is also provided with two air intake openings 6, which have ball check valves, and with an oil hole 7, oil holes being on the upper sides of the cylinders. The outer ends of the cylinders are closed and are connected together by a hose 8 provided with a suitable nipple 9 for the attachment of a flexible tube through which to inflate an automobile tire.

The cylinders are spaced apart and are shown molded solidly to the base as at 10, in the drawings, but of course, said cylinders may be separable elements connected, in any desired manner, to the base. The base is also provided, near the end opposite the cylinders with a standard 11 which has a bearing for a shaft 12. A pair of friction wheels 13 are secured on the ends of the shaft and arranged on opposite sides of the standard 11. Each cylinder has a piston 14 arranged for operation therein and each piston is connected to a crank pin 15 of one of the wheels 13 by a pitman 16. In order to operate our improved pump one of the rear wheels of an automobile will be raised slightly by means of jacks and then lowered and arranged to bear on the friction wheels 13. When the motor is started and the said wheel driven, the wheel which is in engagement with the wheels 13 will rotate the latter and thereby operate the pump, as will be understood. By the provision of the two cylinders and the ball check intake valves the efficiency of the pump is greatly increased. The construction of the base of the pump is such as to form a stable support for the pump and prevent the pump from slipping when set and used on a dirt road. The standard 11 being in the center of the rear end of the base also improves the steady operation of the pump.

Having thus described our invention we claim:—

A pump of the class described comprising a base having one end thereof tapered, upstanding flanges formed in each of the marginal edges of said tapered end, a standard formed medially of the tapered end, flanges formed on the opposite sides of said standard, each of which is disposed in parallel spaced relation to one of the adjacent first mentioned flanges, cylinders formed integrally with the upper edges of said flanges, a second standard formed on the base at the opposite end thereof and in horizontal alinement with the first mentioned standard, a shaft journaled in the last mentioned standard, a pair of friction wheels on the ends of said shaft and disposed upon the opposite sides of said standard, crank pins formed on the outer faces of said wheels, pistons in the cylinders, and pitmen connecting said pistons with said crank pins.

In testimony whereof we affix our signatures in presence of two witnesses.

WILLIAM JOSEPH WHITE.
WM. FRANK NEAL.

Witnesses:
ANNA BAIRD,
CHAS. M. DUNN.

Copies of this patent may be obtained for five cents each, by addressing the "Commissioner of Patents, Washington, D. C."